April 18, 1961 C. A. KAZMIEROWICZ 2,980,568
PLASTIC PIPE COVERING
Filed Jan. 12, 1956
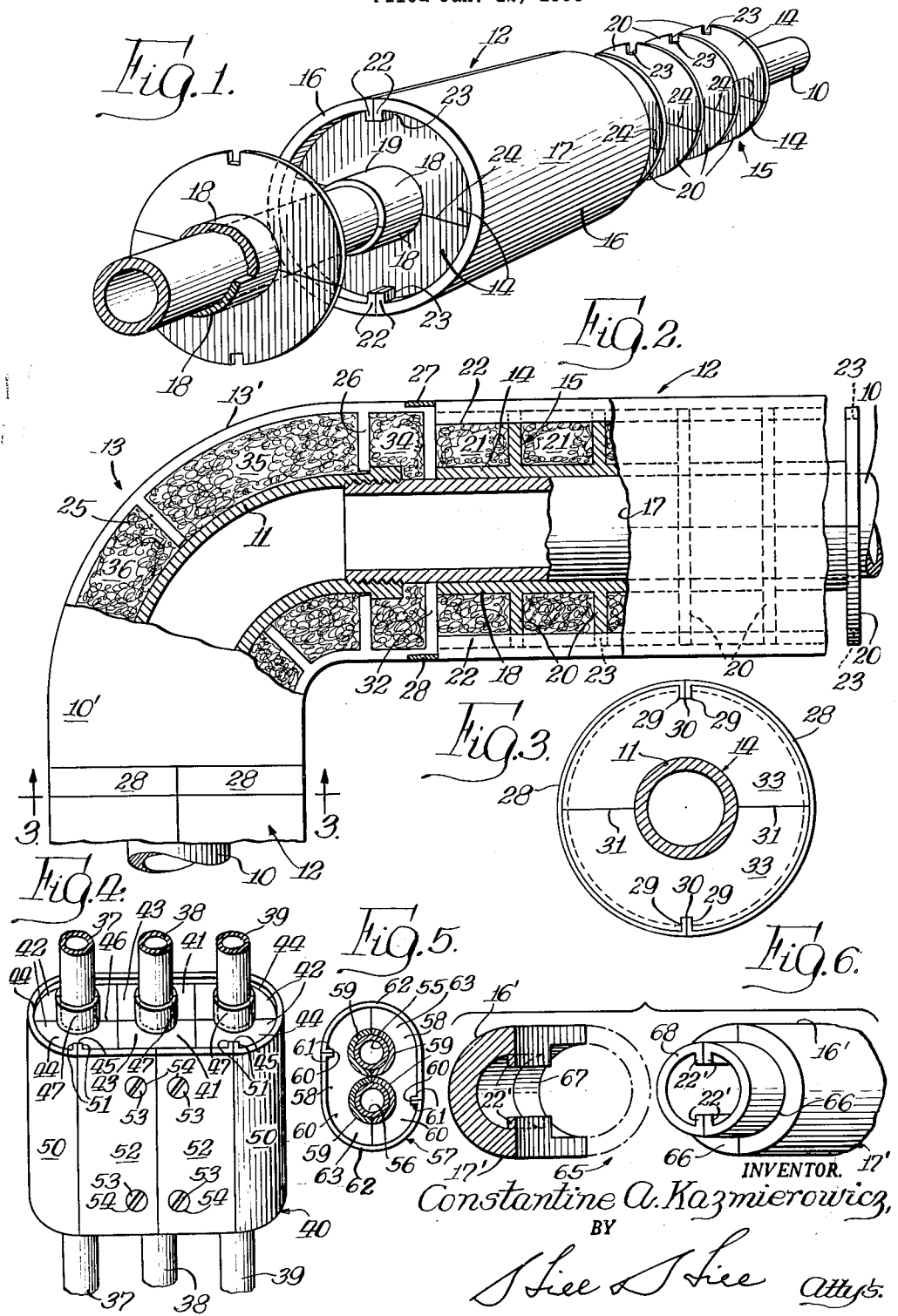
INVENTOR.
Constantine A. Kazmierowicz,
BY
Hee & Hee Attys.

United States Patent Office 2,980,568
Patented Apr. 18, 1961

2,980,568

PLASTIC PIPE COVERING

Constantine A. Kazmierowicz, 9648 Massasoit Ave., Oak Lawn, Ill.

Filed Jan. 12, 1956, Ser. No. 558,737

7 Claims. (Cl. 154—44)

This invention relates to the insulation of pipes, conduits, cables, and the like; and more particularly to pipe coverings for insulated pipes, and the like.

Conventional pipe coverings prior to my invention required the use of glues, cements, or other bonding materials together with metal straps for their installation. Such coverings usually have a porous, not readily washed outer surface, and the plastic pipe covering of my invention may be readily installed without the use of glues, cements, or other bonding materials of any kind, and its outer surface is smooth and easily washed.

It is therefore a principal object of my invention to provide an improved plastic pipe covering having the above advantages over conventional forms of pipe coverings.

Still another object of my invention is to provide a pipe covering of short sections that are in abutting relationship when installed.

Still another object of the invention is to provide a pipe covering for straight lengths of pipe wherein the pipe covering preferably comprises two symmetrical halves for forming the inner core and two symmetrical halves for forming the outer covering.

Still another object of the invention is to provide an inner core comprising a semi-cylindrical sleeve running the length of the pipe with semi-circular ribs perpendicular to the axis of the sleeve and so formed as to detachably receive the outer covering therefor.

Another object of the invention is to provide a plastic pipe covering having a smooth, impervious surface which may be wiped clean with a damp cloth and which stays cleaner longer.

Still another object is to provide a plastic pipe covering which requires no painting and thereby eliminates maintenance.

Still another object of the invention is to provide a plastic pipe covering made in various colors or combination of colors for decoration and for identification purposes.

Still another object of the invention is to provide a plastic pipe covering for various conventional pipe fittings.

Still another object of the invention is to provide an improved form of pipe covering to prevent rodents and insects from destroying the insulation by building nests, etc., therein.

According to the invention, the following features are incorporated to provide an improved pipe covering which is preferably made up of short sections which are installed by abutting contiguous sections together. The improved plastic pipe covering also preferably comprises for straight lengths of pipe four parts; namely, two symmetrical halves forming the inner core and two symmetrical halves forming the outer covering. Each inner core of the pipe covering preferably comprises a semi-cylindrical sleeve running the length of the pipe with semi-circular ribs perpendicular to the axis of the sleeve and slotted at the middle of the ribs so that the outer covering may be detachably affixed thereto. Each half of the outer covering is preferably formed as a semi-cylindrical sleeve having a longitudinal inturned flange extending radially inward along each longitudinal edge to detachably engage the slots of the semi-circular ribs.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Fig. 1 is an exploded perspective view, partly in section, of a section of the pipe showing the inner core and outer core of my invention;

Fig. 2 is a view in elevation, partly in section, showing the plastic pipe covering of Fig. 1 for straight lengths of pipe, and the plastic pipe covering for conventional pipe fittings, such as a 90° elbow assembled together;

Fig. 3 is a view, partly in section, taken along line 3—3 of Fig. 2, illustrating the cross section of the securing means for the pipe fitting;

Fig. 4 is a perspective view of a modified form of plastic pipe covering for covering several pipes;

Fig. 5 is a view in elevation of another embodiment of my invention for covering two closely mounted pipes; and Fig. 6 is an exploded view, illustrating a joint connection for opposite ends of the outer pipe covering for connecting contiguous ends of the pipe covering of my invention.

Referring to Fig. 1, Fig. 2, and Fig. 3, the pipe covering of this invention is particularly adaptable to pipe lines carrying steam for heating or processing and other pipe lines for carrying processing fluids at high temperatures which it is desired to insulate, and also to particularly identify for maintenance as to the type of fluid flowing through the pipe line. A pipe line 10 of this type having conventional pipe fittings, such as an elbow 11, is provided with the improved plastic pipe covering 12 for straight lengths of pipe and with a plastic covering 13 for the 90° elbow 11. The pipe covering 12 is preferably fabricated of short sections that are abutted together when installed, though it is within the scope of the invention that fabricated pipe coverings may be made up corresponding to the conventional pipe lengths, for example, ten foot lengths or any other multiple thereof, so that for long lengths of pipe these longer sections may be readily installed. Shorter lengths of the multiple length may also be provided to complete the installation. It is also desirable to provide a pipe covering construction which may be readily sawed to the proper lengths for speedy installation. For the straight lengths of pipe, it is preferred that the sections of the pipe covering shall comprise four parts, namely, two symmetrical halves 14 providing the inner core 15, and two symmetrical halves 16 providing the outer covering 17.

The inner core 15 formed by the symmetrical halves 14 preferably comprises an integrally molded construction of a suitable plastic, for example, "Bakelite," polystyrene, polyethylene, vinyl, or other conventional types of synthetic, polymeric organic compounds and resins which withstand heat within the range of the temperature of the fluids being carried, and which will not char or become disintegrated due to substantially high temperatures. It is preferred to form each symmetrical half 14 with a semi-circular sleeve portion 18 so that when the two halves 14 are assembled together, a tubular sleeve construction 19 is formed to complementally receive the pipe to which the pipe covering is to be applied. The diameter of the tubular sleeve portion 19 is complemental to the outside diameter of the pipe, and it is within the scope of the invention that these coverings may be made for all conventional sizes of pipe to which it is desired to apply insulation and a cover therefor. Symmetrically spaced along the length of the semi-circular portion 18 are semi-circular rib members 20. These may be spaced at any standard spacing and are preferably of such a thickness as to give rigidity to the semi-circular sleeve portion 18. The radius of the rib members 20 correspond to the thickness required for insulating the pipe in accordance with the temperature gradient of the fluid within the pipe. With this construction, it is preferable to use prefabricated and molded insulation members 21 which may be either first prefabricated and integrally molded with the semi-circular halves 14 of the inner core, or they may be prefabricated and inserted after the assembly of the symmetrical halves 14 of the inner core 15 on the pipe 10. The tolerances of the prefabricated semi-circular insulated members 21 should be such that they may be pressed in place and held between the semi-circular fin members 20, either upon assembly on the inner cores prior to erection or upon the inner cores after erection thereof and before the assembly of the outer covering 17 thereon.

The symmetrical halves 16 forming the covering 17 are also formed of a suitable plastic, such as described above and more completely later with respect to the material forming the symmetrical halves 14 of the inner core 15. The ends of the halves 16 of the outer covering are provided with radially and inturned flanges 22 which extend axially the length of each section forming the outer covering. These flanges are complementally formed at the abutting ends of the halves 16 to be detachably mounted within a notch 23 in each rib 20 of the symmetrical halves 14 of the inner core 15. With this construction, it is permissible to slide first one half 16 of the outer covering longitudinally with respect to the inner core assembly 15, if part of the pipe 10 has been left uncovered, and then slide the other half of the covering so that the flanges of the contiguous ends of the symmetrical halves are in abutting relation, as illustrated in Fig. 1 and Fig. 3. It is also possible with the halves of the pipe covering to snap the axially extending flanges 22 within the aligned notches 23 of the inner core, if plastics are used for forming the cover having sufficient resilience to permit an outward movement to permit the inner edges of the flanges to slide across the outer periphery of the semi-circular rib members 20. With this construction, it is a simple matter to first erect in place the semi-circular halves of the inner core on the pipe, after which the halves of the outer covering may be slid or snapped in place. Although the inner halves 14 of the inner core have been shown in Fig. 1 with the contiguous edges of the semi-circular portions 18 and the edges of the fins 20 in abutting relationship, it is also within the scope of this invention that these abutting edges may be constructed with a complementally formed half lap or other suitable joint with the opposite edges complementally formed and symmetrically arranged so that the inner halves 14 may be readily assembled and have interlocking joints.

Although the outer covering 17 has been illustrated as being formed in halves which are joined to the inner core 15 by the flanges 22 complementally formed to the aligned notches 23 of the inner core 15 placed at right angles to the joint 24 formed by the abutting halves 14, it is also within the scope of the invention that other arrangements of the covering may be had, depending upon the size of the pipe covering, in order to assist in the erection of the covering on the pipes. However, with the construction as illustrated in Fig. 1, this is a simple construction which may be readily extruded to the cross section as described. However, it is equally simple to extrude other multiples to form multiples which are symmetrical and which, when assembled, will provide a complete circular housing. The circular housing has been preferably selected since it requires a minimum of material though it is also within the scope of the invention that other cross sections, such as rectangular, hexagonal, or octagonal may be used without departing from the scope of the invention.

It is also within the scope of the invention that the inner core and outer covering may be molded from suitable colored plastics which may be used as an indicia for the type of fluid flowing through the pipe being covered. The covering may also be made in various colors or combination of colors permitting greater decorative value.

The various pipe fittings, such as elbows, T's, unions and the like used with piping are also fabricated from the same plastic material as forming the outer covering 17. As illustrated in Fig. 1, these are preferably fabricated in halves 13' in which the complementally formed edges thereof may be either abutting, as illustrated in Fig. 2, or formed with half lap joints or other types of joints to form overlapping edges, as was described with respect to the joints between the abutting halves 14 forming the inner core. Each half 13', for example, for the elbow 11 may be formed with semi-circular fins 25 and 26 with semi-circular openings corresponding to the diameter of the pipe coupling 11. Each end of the covering 13 for the elbow may be formed with an annular recessed groove 27 to which is assembled a semi-circular snap ring 28, the ends of which are formed as illustrated in Fig. 3 with inturned flanges 29 engaging slots 30 at right angles to the joint 31 between the halves of the covering for the elbow. It is preferred to form each end of the fitting with a semi-circular rib 32 which may be formed as an annular washer similar to the assembly 33 of the semi-circular halves 33, Fig. 3. The diameter of the assembled semi-circular ribs 32 corresponds to the outer diameter of the annular recess 27 formed by the halves 13' of the covering 13 for the elbow 11. It is preferable to use these semi-circular ribs 32 contiguous to each end of the elbow as shown in Fig. 2. It is preferred that the assembly 33 of the semi-circular halves 32' is integrally formed with the semi-circular covering 13' as are the ribs 25 and 26. It is within the scope of the invention that the semi-circular ribs 32 when formed as an annular washer may be assembled as an annular washer on the free end of the pipe or they may be assembled in semi-circular halves 32 at the time of assembly of the outer covering 12. It is also within the scope of the invention that the semi-circular ribs 25 and 26 may be separately formed and assembled in place at the time of erection of the elbow covering 13. Although the semi-circular halves 13' for the elbow covering have been shown without a sleeve construction comparable to the semi-circular sleeve construction 18 for the straight length of pipe, it is also within the scope of the invention that a sleeve construction may be integrally molded with each semi-circular half complemental to the outer periphery of the elbow 11. It is also within the scope of the invention that the coverings for the fittings may be formed with an inner core and covering as described above for the pipe or metallic conduit structure 10. Molded insulation 34, 35, and 36 may be made in semi-circular halves and complemental to the inner periphery of the semi-circular halves 13' and complemental to the outer periphery of the pipe fitting 11. The insulated portions 35 and 36 may be symmetrically formed and identical, and at each end of the pipe fitting complemental to the end of the pipe fitting, the insulated portion 34 may be complementally molded to fit between the rib 26 and the semi-annular rib 32. Although there has been only disclosed a construction with respect to Fig. 2 for insulating and covering a pipe fitting as a 90° elbow, it is to be understood that it is within the skill of one skilled in the art that other types of fitting, such as T's, 45° elbows, crosses, and other similar fittings may have insulated plastic coverings similarly constructed as described with reference to the elbow fitting 11.

Referring to Fig. 4, there is illustrated a plastic pipe covering for a multiple arrangement of piping or metallic conduit structure which may be used for insulating fluids or for cable coverings and the like constructions. In this construction, a plurality of pipes 37, 38, and 39 which, in general, may correspond to straight lengths of pipe 10 and may be of any standard size are closely assembled as shown to conserve space, particularly as it is desired to insulate these pipes as a group, and these pipes may or may not carry the same fluids. In this construction, the assembled insulated and plastic covering 40 comprises symmetrically shaped central sections 41 and symmetrically shaped sections 42 for the outer pipes 37 and 39. The symmetrical halves 41 may be formed with the symmetrically shaped ribs 43 similarly arranged as the ribs 20, but in this embodiment of Fig. 4 the ribs are substantially rectangular in shape rather than semi-circular in shape as are the ribs 20. The ribs 44 of the sections 42 are also symmetrically arranged and shaped as illustrated and complete the cross section for the insulation of the three pipes. The ribs 44 are similarly shaped as are the ribs 43 and each rib is shaped as shown. The ribs 43 and 44 are axially spaced as the ribs 20. Each of the ribs 44 is provided with diametrically opposite notches 45 perpendicularly arranged to the transverse joint 46 formed by the symmetrically arranged halves. Each symmetrically shaped central section 41 and symmetrically shaped outer section 42 has the respective ribs 43 and 44 integrally molded to a semi-circular sleeve 47 similar to the sleeve 18. It is also within the scope of the invention that the joint between abutting halves of the sections may either have an abutting joint, for example, as shown between the sleeves 18 of Fig. 1; or they may be provided, for example, with a half lap joint or other joints as is well understood in the art.

The outer plastic covering to complete the assembled plastic covering 40 preferably comprises the semi-circular end covering 50 formed with longitudinally extending and radially inturned flanges 51 which may be similar to the flanges 22. It is also within the scope of the invention that the semi-circular outer coverings 50 for the same size of pipe may be identical to the semi-circular outer coverings 16 as described with the plastic pipe covering construction of Fig. 1. The inturned flanges 51 are complemental to the notches 45 formed in the ribs 44 and, in turn, may be identical in size as the notches 23 of the construction of Fig. 1. In order to cover the intermediate sections, symmetrical rectilinear coverings 52 are also formed with axially extending and radially inturned flanges 51, and the flanges 51 of the coverings 50 and 52 are complementally formed to be received within the notches 45.

In assembling the covers 50 and 52, the covers may be slid longitudinally, for example, as described with reference to the construction of Fig. 1, or they may be snapped in place. The symmetrical coverings 52 are also assembled in the same manner though it is preferred, in addition, to use securing means 53 extending through openings 54 in the coverings with the securing means engaging suitably threaded openings which may be integrally molded with certain of the ribs 43 (not shown). It is preferred that the securing means 53 shall be complementally formed to the countersunk openings 54 to be flush, although other forms of securing means may be used.

Insulation may be molded to conform to the spaces between the ribs 43 of the symmetrically shaped center sections 41, and also molded to correspond to the spaces between the ribs 44 of the symmetrically shaped end sections 42. This insulation may be loose rock wool or molded shapes of rock wool, fiber glass, molded expanded slag, or other expanded forms of insulation which may be readily assembled prior to or during erection of the plastic coverings, and may even be integrally molded during the fabrication of the inner sections.

Referring to Fig. 5, there is illustrated another embodiment of my invention wherein the pipes 55 and 56 may be similar to the pipes 10 described with reference to Fig. 1, and the pipes 37, 38, and 39 described with reference to Fig. 4 but, instead of being spaced, are in abutting relationship as illustrated. The plastic and insulated covering 57 preferably comprises symmetrically formed inner sections 58 integrally comprising a semi-circular sleeve 59 to which the ribs 60 are integrally molded. The ribs 60 are shaped as illustrated in Fig. 5 and are formed with notches 60 corresponding to the notches 45 of the modification of Fig. 4 and notches 23 of the embodiment of Fig. 1 to complementally receive the radially inturned flanges 61 similar to the longitudinally extending flanges 22 and 51. Symmetrically arranged outer coverings 62, also of plastic, substantially similar to the inner sections, are formed comprising a semi-circular portion and a flat tangential portion, as shown. These may be slid longitudinally or snapped in place as the outer coverings 16 of Fig. 1 and the coverings of Fig. 4. Integrally molded insulation or loose insulation may be assembled in place prior to the installation of the outer covering, and of substantially the same shape as the space between the ribs 63 corresponding to the cross-sectional shape of the inner sections 58.

Referring to Fig. 6, there is illustrated a joint construction for the ends of the pipe covering 17 as described with reference to Fig. 1, but instead of abutting contiguous ends of the pipe covering there is formed a lap joint for the contiguous abutting ends. The outer pipe covering 17' comprises the symmetrical halves 16', the opposite ends of which are formed with a lap joint 65 as shown in the exploded view. The lap joint 65 is formed by the opposite ends of the symmetrical halves 16' so that when the ends are abutted together, the lap joint is formed. Each half 16' is formed with a semi-circular recessed edge 66 at one end of the outer pipe covering which, when assembled together, forms an annular recessed edge which is complementally formed to a semi-circular groove 67 at the opposite end. This semi-circular groove 67, when assembled with the other half of the outer covering, forms an annular groove complemental to the tongue portion 68 formed by the annular recess 66. The tongue portion is formed with inturned flanges 22' as are the opposite ends. This flange 22' extends the full length of the outer covering, as illustrated in the exploded view of Fig. 6, showing the opposite ends of two abutting outer covering constructions 17'. The notches 22' are complementally formed to the notches 23 of the ribs as described with reference to Fig. 1.

In the modification as described with reference to Figs. 2 and 3, the halves of the plastic covering 13 for the elbow are held together by the semicircular band 28. It is also within the scope of the invention that the covering 17 may be extended an amount corresponding to the band 28 and te flanges 22 may or may not be extended to fit, for example, into notches in the member 32 formed similarly as the notches 23 in the ribs 20.

It is thus evident that there has been described a plastic pipe covering which is economical to fabricate, certain parts of which may be molded or extruded, and other parts of which may be separably fabricated and assembled, for example, the ribs 20 may be assembled to an extruded sleeve 18, or the sleeve and the ribs may be integrally molded together.

The insulation may also be readily applied and may be molded or packed in place and may incorporate such types of insulation as rock wool, vermiculite, expanded types of insulation, and the like.

It is also obvious that there has been described a plastic pipe covering which may be fabricated using a common inner core, the outer coverings of which may be different, and colored to correspond to the codes used for identifying various fluids and the like flowing through the pipes or conduit structures being insulated.

It is further evident that there has been described a plastic pipe covering which has an impervious surface that may be readily wiped clean and which stays cleaner longer, and requiring no painting eliminates an additional maintenance cost.

The covering or insulating covering requires no special skill to install and when installed is neater and more uniform in appearance than coverings which are not prefabricated to cover various fittings and conduit structures.

It is within the scope of the invention that the plastic pipe covering comprising the inner core and outer covering therefor, may be formed from any suitable material by injection molding or other forms of molding. It is preferred to use a plastic material having a high impact strength though it is also within the scope of the invention that urea formaldehyde molding material may be used. It is also within the scope of the invention that one may use a polyester glass fiber laminated sheet, for example, in the fabrication of at least the outer covering. It is also within the scope of the invention that phenolic sisal plastic may be used. It is also within the scope of the invention that the inner core and the outer covering therefor may be fabricated from "Laminac" resins which are thermosetting by direct polymerization. If certain parts of the pipe covering are formed from this material, they may be produced on cheap wooden plaster or sheet metal molds with a few pounds of fluid or static pressure. Cellulose nitrate plastics may be used as well as polystyrene materials of vinyl chloride combinations, vinyl chloride acetate for injection molding, and acrylic material alone or in combination with vinyl chloride sheets. Any suitable plastic which provides for reduction in weight with high impact strength may be used which resists chemicals, water, and any torsional strains such as are set up by movement of the pipe during expansion and contraction caused by changes in temperature.

Obviously, there has been disclosed an improved form of inner core and plastic covering for use with the thermo insulation of piping or conduit structures of metal or other suitable material, such as may be used for heating and for the transmission of chemicals or other fluids for which it is desired to prevent undue loss of heat in transmission, which is economical to manufacture, and one in which the use of non-metallic materials for the plastic pipe covering permits a reduction in cost of the installed installation, and which may also be manufactured using conventional methods for the fabrication of the inner core and conventional methods in the fabrication of the non-metallic material also forming the covering therefor.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A pipe covering composed of an inner core formed of symmetrical halves, each of which is formed with a semi-cylindrical sleeve portion to provide when the two halves are assembled a tubular sleeve construction for receiving the pipe and having along the outer circumference thereof semi-circular rib members slotted at the middle thereof, and an outer covering formed of two semi-cylindrical sleeves each having a longitudinal inturned flange extending radially inwardly along each longitudinal edge to detachably engage the slots of the semi-circular ribs.

2. A pipe covering as defined in claim 1 wherein the inner core is formed of a heat resistant plastic material.

3. A pipe covering as defined in claim 2 wherein said heat resistant plastic material is polyethylene.

4. A pipe covering as defined in claim 2 wherein said heat resistant plastic material is polystyrene.

5. A pipe covering as defined in claim 1, wherein said semi-cylindrical sleeves are symmetrical and said longitudinally inturned flanges of the semi-cylindrical sleeves are in abutting relationship and complementally formed to the slots of the semi-circular rib members providing for the reception of the inturned flanges so that upon assembly of the two semi-cylindrical sleeves of said outer covering upon the inner core, the symmetrical halves of the inner core and the symmetrical sleeves of said outer covering are affixed together.

6. A pipe covering as defined in claim 1, wherein said symmetrical halves of the inner core and the symmetrical sleeves of said outer covering are formed of a heat resistant plastic.

7. A pipe covering as defined in claim 5, wherein the pipe covering is adapted for insulating a pipe, said semi-cylindrical sleeve portions of said inner core are complementally formed to and for operatively engaging the outer peripheral surface of said pipe, said inner core and said outer covering formed of a heat resistant plastic, said semi-circular rib members of the symmetrical halves of the inner core being axially spaced, and insulation positioned between the spaced ribs of the inner core completing the insulation of the pipe about which the pipe covering is positioned.

References Cited in the file of this patent

UNITED STATES PATENTS

| | | |
|---|---|---|
| 411,115 | Wendell | Sept. 17, 1889 |
| 1,105,844 | Schaperjahn | Aug. 4, 1914 |
| 1,419,171 | Read | June 13, 1922 |
| 2,041,911 | Ericson | May 26, 1936 |
| 2,089,909 | Mansfield | Aug. 10, 1937 |
| 2,365,086 | Kamowski | Dec. 12, 1944 |
| 2,532,587 | Williamson | Dec. 5, 1950 |
| 2,650,180 | Walker | Aug. 25, 1953 |
| 2,841,203 | Gronemeyer | July 1, 1958 |